(12) United States Patent
Whitesell et al.

(10) Patent No.: US 6,466,184 B1
(45) Date of Patent: Oct. 15, 2002

(54) THREE DIMENSIONAL VOLUMETRIC DISPLAY

(75) Inventors: Eric James Whitesell, San Diego, CA (US); Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/222,616

(22) Filed: Dec. 29, 1998

(51) Int. Cl.$^7$ ................................................. G09G 5/00
(52) U.S. Cl. ......................................................... 345/6
(58) Field of Search ............................ 345/6, 139, 419, 345/32

(56) References Cited

U.S. PATENT DOCUMENTS

| | | | | |
|---|---|---|---|---|
| 3,140,415 A | * | 7/1964 | Ketchpel | 315/385 |
| 4,200,808 A | * | 4/1980 | Herbst | 359/329 |
| 4,881,068 A | * | 11/1989 | Korevaar et al. | 345/6 |
| 5,162,787 A | * | 11/1992 | Thompson et al. | 345/32 |
| 5,488,952 A | * | 2/1996 | Schoolman | 600/443 |
| 5,530,711 A | * | 6/1996 | Scheps | 372/20 |
| 5,684,621 A | | 11/1997 | Downing | |
| 5,764,403 A | | 6/1998 | Downing | |

FOREIGN PATENT DOCUMENTS

WO    WO 94/18662    *  8/1994    ............ G09G/3/02

* cited by examiner

*Primary Examiner*—Richard Hjerpe
*Assistant Examiner*—Alexander Eisen
(74) *Attorney, Agent, or Firm*—Celia C. Dunham; James A. Ward

(57) ABSTRACT

A three dimensional display provides a true 3-D display of an image defined by luminous voxels within a virtually transparent volume. The voxels may be generated by illuminating a virtually transparent fluorescent gas or dye with beams of excitation energy that cause the gas or dye to emit light at voxels where the energy beams intersect. The voxels may be refreshed in a manner to create either fixed or animated images.

17 Claims, 4 Drawing Sheets

THREE DIMENSIONAL VOLUMETRIC DISPLAY

The invention described below is assigned to the United States Government and is available for licensing commercially. Technical and licensing inquiries may be directed to Harvey Fendelman, Legal Counsel For Patents, SPAWARSYSCEN SAN DIEGO CODE D0012 Room 103, 53510 Silvergate Avenue, San Diego, Calif. 92152; telephone no. (619)553-3001; fax no. (619)553-3821.

BACKGROUND OF THE INVENTION

The present invention relates to generating a three dimensional representation of an object that may vary in position, orientation, and shape. More specifically, but without limitation thereto, the present invention relates to illuminating a substance with excitation energy to generate a visible representation of a three dimensional object within a spatial volume.

3-D display technologies such as holography, stereoscopic displays, and advanced 3-D graphics engines generally render three dimensional (3-D) images on a two dimensional (2-D) display by mapping the coordinates of the 3-D images into a 2-D perspective. However, these technologies lack the physiological depth cues needed for true 3-D display imaging, such as motion parallax, accommodation, convergence, and binocular disparity. A 3-D volumetric display provides the physiological depth cues needed for such applications as air traffic control, submarine undersea navigation, automotive design, architecture, and medical imaging.

One method for displaying a true three-dimensional image is to illuminate a series of points on a two-dimensional surface as it moves through a display volume. However, these volumetric displays suffer the disadvantages of mechanical constraints on the voxel refresh rate, because a voxel may only be refreshed when the display surface is in the correct position within the display volume. A voxel is defined as a graphic unit of information representative of a point in a three dimensional image space, analogous to a pixel as a graphic unit of information representative of a point in a two dimensional image space. This type of display also suffers from the disadvantages of instability in the moving two dimensional surface that may cause the image to jitter, added weight and mechanical complexity that may make shipboard and aircraft applications impractical, and the display surface motion itself that may distract attention from the image being displayed.

Another approach to a 3-D display is described in U.S. Pat. No. 5,684,621 issued on Nov. 4, 1997 to Elizabeth Downing and incorporated herein by reference thereto. This display suffers from the disadvantages associated with voxels that require expensive rare earth crystalline materials and the impracticality of scaling to large sizes.

A need therefore exists for a three dimensional volumetric display that does not require a two dimensional surface within the display volume and which may readily be scaled in size.

SUMMARY OF THE INVENTION

The present invention is directed to overcoming the problems described above, and may provide further related advantages. No embodiment of the present invention described herein shall preclude other embodiments or advantages that may exist or become obvious to those skilled in the art.

A three dimensional display of the present invention provides a true 3-D display of an image defined by luminous voxels within a virtually transparent display volume. The voxels may be generated by illuminating a fluorescent gas with multiple beams of excitation energy that cause the gas to emit light at voxels where the energy beams intersect. The voxels may be refreshed in a manner to create either fixed or animated images within the display volume.

An advantage of the three dimensional display of the present invention is that a true 3-D image may be generated within a virtually transparent volume without the refractive distortions of solid media.

Another advantage is that the weight and cost of the display materials is substantially reduced over that of solid state displays that require a glass doped with rare earth ions.

Still another advantage is that highly visible displays may be generated with low power lasers.

Yet another advantage is that the three dimensional display of the present invention may readily be scaled in size.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
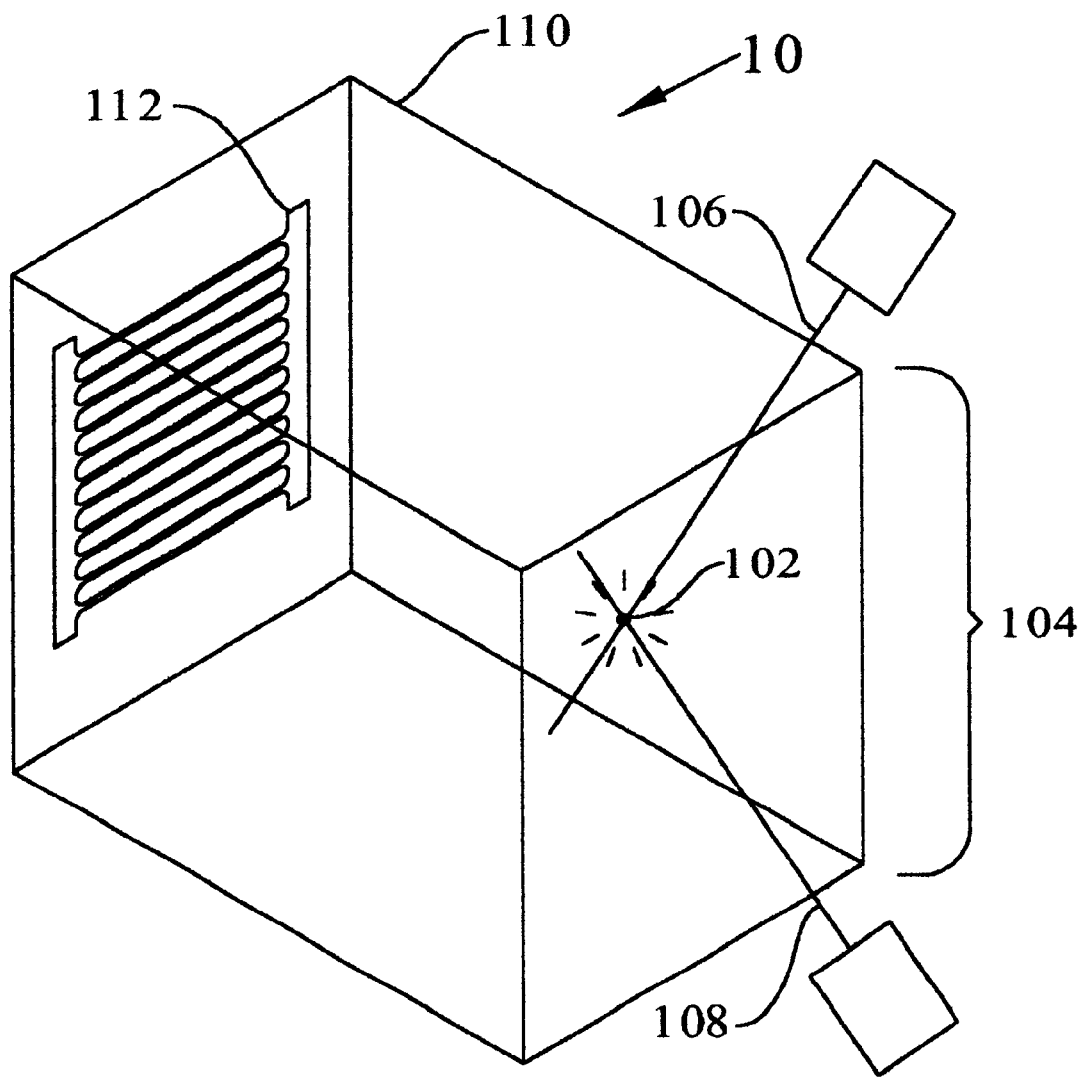
FIG. 1 is a diagram of a three dimensional display of the present invention.

FIG. 1 is a diagram of a three dimensional display 10 of the present invention comprising a voxel (a three dimensional graphic coordinate) 102 inside a display volume 104 filled with a substantially transparent fluorescent gas. Instead of a gas, display volume 104 may also comprise a fluorescent dye in a solid or liquid matrix. Voxel 102 is illuminated by the intersection of two laser beams 106 and 108. Laser beams 106 and 108 may be, according to well known techniques, continuously generated and deflected to generate images of solid shapes or pulsed to generate wire frame images as well as images defined by a series of illuminated points.

An example of a suitable gas for use with laser beams 106 and 108 inside display volume 104 is nitrogen dioxide. In this example, laser beams 106 and 108 preferably each have a wavelength of from about 900 nm to 1000 nm (the wavelengths may be equal if desired). Nitrogen dioxide absorbs within this range and fluoresces in the infrared with a decay time of about 44 usec. At the voxel located at the intersection of laser beams 106 and 108, however, excitation to a higher energy state by the absorption of energy from both laser beams 106 and 108 results in fluorescence in the form of visible green light that emanates from the voxel. A glass vessel 110 may be used to contain the nitrogen dioxide gas within display volume 104.

Another example of a suitable gas for use with laser beams 106 and 108 inside display volume 104 is iodine vapor. In this example, laser beam 106 preferably has a wavelength of about 841 nm and laser beam 108 preferably has a wavelength of about 2660 nm. At the intersection of laser beams 106 and 108, excitation to a higher energy state by the absorption of energy from both laser beams 106 and 108 results in fluorescence in the form of visible red light emanating from the voxel. A glass vessel 110 may be used to contain the iodine vapor within display volume 104, and transparent electrode 112 may be deposited on the glass vessel as a heating element to prevent condensation of iodine on the vessel walls.

In addition to a gas, a dye may be suspended in a liquid or solid solution within display volume 104 that preferably has a high quantum efficiency, i.e., a suitable ratio of visible fluorescence photons to excitation photons. An example of a suitable fluorescent dye is rhodamine 6G, which fluoresces with an orange-yellow color. A typical dye concentration for rhodamine 6G is $10^{-3}$ to $10^{-5}$ molar. Suitable solid state matrix materials for suspending fluorescent dyes include polymethyl methacrylate (PMMA or plexiglass), plastics, porous glass, and epoxies. Dye matrix materials should be transparent to both the excitation and fluorescence wavelengths and should not require high manufacturing temperatures that would destroy the dye or contain substances that would quench the fluorescence.

Suitable liquid matrix materials for suspending fluorescent dyes in display volume 104 include the solvents methanol and ethanol as well as a wide range of organic and inorganic fluids including water, and dimethyl sulfoxide (DMSO). Gels, or highly viscous materials such as gelatin and heavy transparent grease or oil, may also be used for the dye matrix.

Fluorescent dyes may also be suspended in display volume 104 as a gas vapor by heating the solid form of the dye in a vacuum. Other means may be used for suspending fluorescent dyes as have been demonstrated in the art of dye lasers. An advantage of dyes is that they do not require doping with rare earth elements.

For excitation of rhodamine 6G dye at the intersection of laser beams 106 and 108, each of laser beams 106 and 108 may have a wavelength of, for example, 1064 nm. A suitable laser for this wavelength is an Nd:YAG laser. While the dye matrix is transparent at the excitation wavelength, the dye has broad absorption at half the laser wavelength. At the intersection of laser beams 106 and 108, two-photon absorption is sufficient to generate fluorescence at voxel 102.

Figure 2:
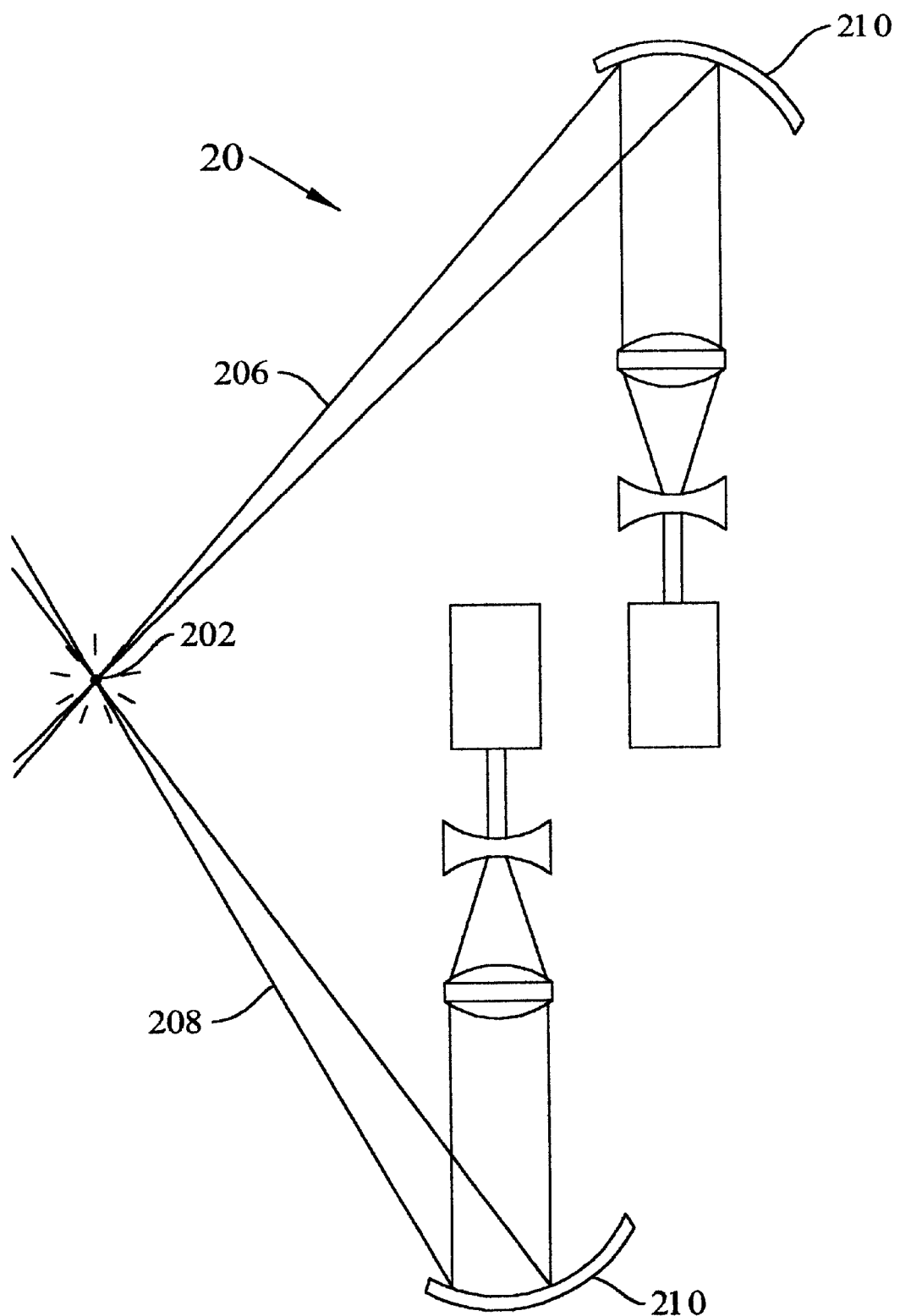
FIG. 2 is an alternative embodiment of a three dimensional display of the present invention with a curved mirror.

In FIG. 2, laser beams 206 and 208 may be collimated and focused by, for example, a curved mirror 210 for concentrating laser energy at voxel 202 to generate visible fluorescence. In this embodiment, a single focused laser may be used to concentrate sufficient laser energy at voxel 202 to generate fluorescence. Curved mirror 210 may also be used with laser beams 106 and 108 in the embodiments of FIGS. 1 and 3. The difficulty of changing the focal point of curved mirror 210 at voxel 202 to accommodate a fast refresh rate may be relieved by sequencing multiple laser beams in ping-pong fashion so that each laser beam has sufficient time to refocus before its turn in the sequence repeats.

Figure 3:
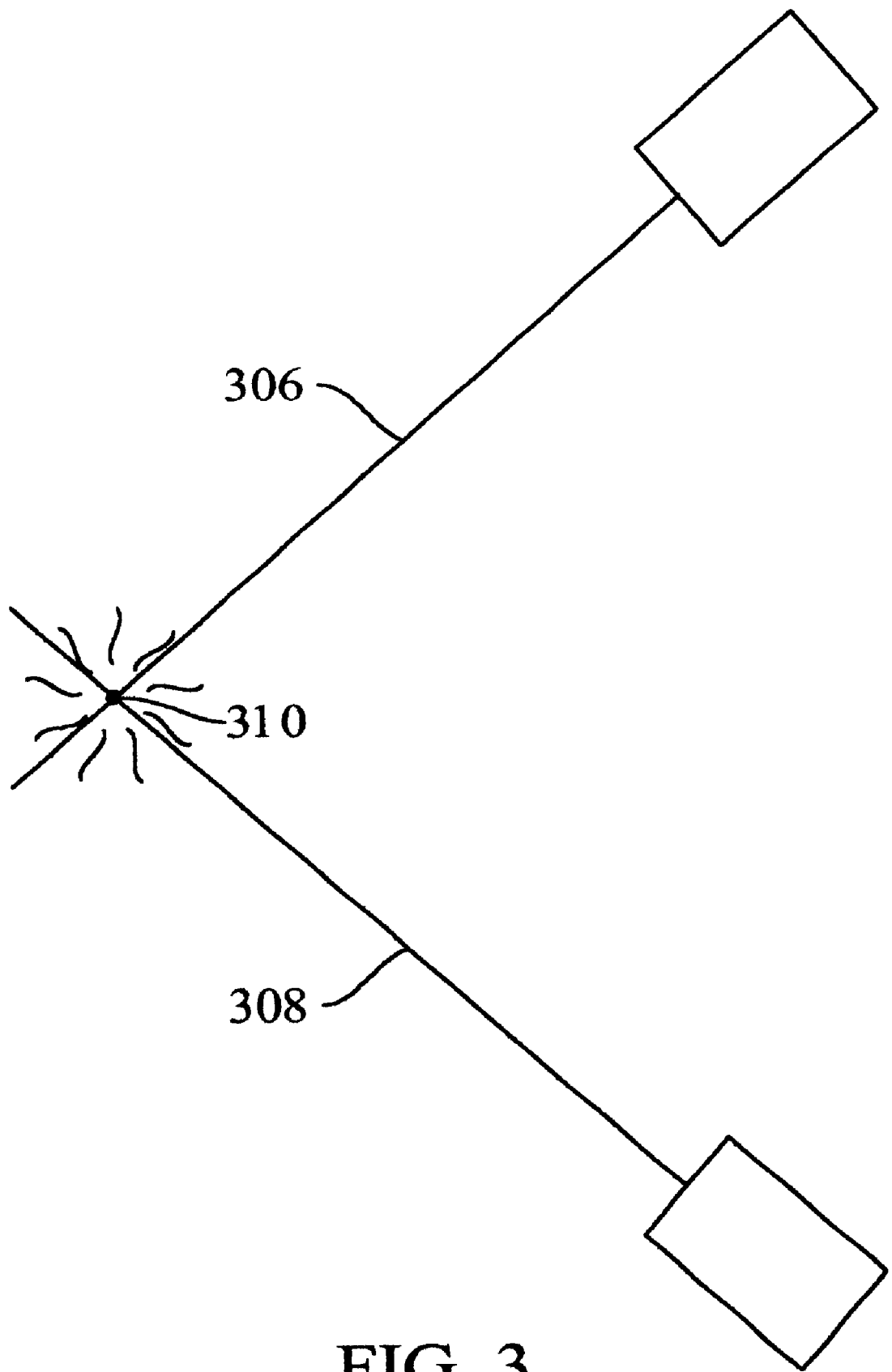
FIG. 3 is an alternative embodiment of a three dimensional display of the present invention with an infrared-absorbing phosphor.

In the embodiment of a three dimensional volumetric display 30 shown in FIG. 3, an infrared phosphor 310 is suspended in display volume 304 in a matrix similar to that described above for fluorescing dyes. Because infrared phosphors are typically inorganic compounds that are resistant to heat, glasses may also be used as matrix materials. Infrared phosphor 310 may be, for example, zinc cadmium sulfide. In operation, infrared phosphor is first excited at voxel 302 by laser beam 306 having a wavelength in the ultraviolet, and then further excited by intersecting laser beam 308 having a wavelength in the infrared. The phosphor absorbs energy from each of laser beams 306 and 308 to generate visible fluorescence.

Figure 4:
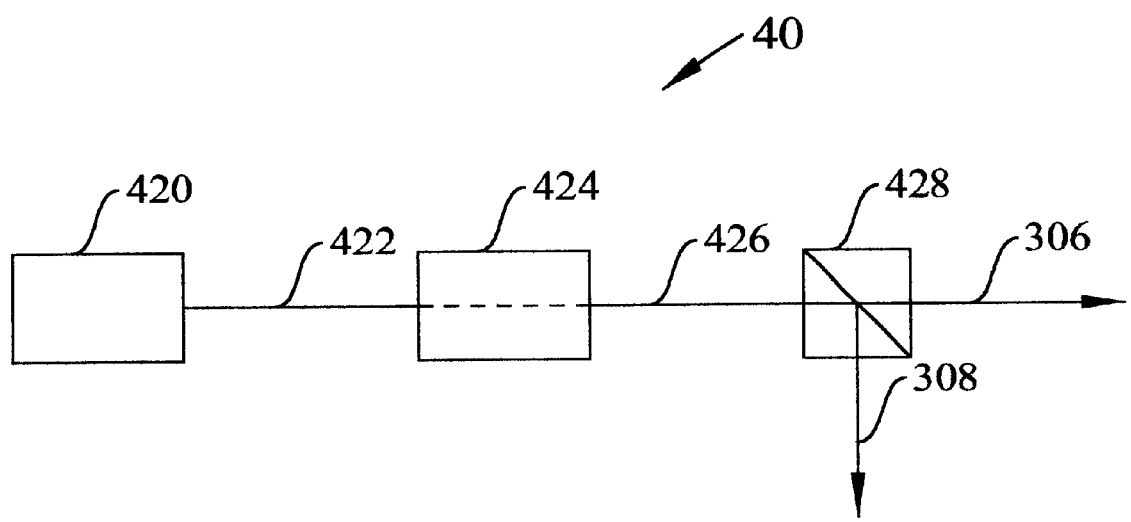
FIG. 4 is an exemplary source of excitation energy for both infrared and ultraviolet wavelengths.

An example of a laser 40 for generating the wavelengths for both laser beams 306 and 308 in FIG. 3 is shown in FIG. 4. A YAG laser 420 generates a laser beam 422 having a wavelength of 1064 nm that is frequency-tripled by tripler 424. An example of a tripler would be a KTP (potassium titanyl phosphate) crystal doubler coupled to a BBO (beta barium borate) sum frequency generating crystal. Laser beam 422 is tripled by frequency tripler 424 to a wavelength of 355 nm. A portion of laser beam 422 that is not converted to ultraviolet by tripler 424 is included in combined output laser beam 426. A beamsplitter 428 may be used to separate the converted ultraviolet energy at 355 nm from the infrared energy at 1064 nm to generate the respective wavelengths for laser beams 306 and 308 in FIG. 3. Beamsplitter 428 may be, for example, a dichroic beamsplitter.

Other modifications, variations, and applications of the present invention may be made in accordance with the above teachings other than as specifically described to practice the invention within the scope of he following claims.

We claim:

1. A three-dimensional volumetric display comprising:
    a diplay volume defined by substantially transparent flourescent gas that includes nitrogen dioxide, and
    excitation source for illuminating the flourescent gas with a beam of excitation energy to generate visible ligh in the display volume.

2. The three dimensional volumetric display of claim 1 wherein the excitation energy has a wavelength of from about 900 nm to 1000 nm.

3. A three dimensional volumetric display comprising:
    a display volume defined by a substantially transparent fluorescent gas that includes iodine vapor; and
    an excitation source for generating excitation energy beams that cause visible light to be generated at the intersection of the excitation energy beams within the display volume.

4. A three dimensional volumetric display comprising:
    a display volume defined by a substantially transparent fluorescent gas that includes iodine vapor; and
    an excitation source for illuminating the fluorescent gas with first and second excitation beams to generate visible light in the display volume, wherein the first excitation beam has a wavelength of about 841 nm and the second excitation beam has a wavelength of about 2660 nm.

5. A three dimensional volumetric display comprising:
    a display volume filled with a substantially transparent fluorescent gas that includes iodine vapor;
    an excitation source for generating beams of excitation energy that generate visible light where the beams of excitation energy intersect within the display volume;
    a vessel enclosing the display volume made of a substantially transparent material;
    and a substantially transparent electrode deposited on the vessel for heating the vessel to prevent condensation of the fluorescent gas.

6. A three dimensional volumetric display comprising:
    a substantially transparent vessel enclosing a display volume defined by a rhodamine 6G fluorescent dye suspended in a substantially transparent matrix;

and a source for generating first and second excitation beams that cause visible light to be generated wherever the first excitation beam intersects the second excitation beam within the display volume.

7. The three dimensional volumetric display of claim 6 wherein the excitation beams have a wavelength of about 1064 nm.

8. A three dimensional volumetric display comprising:

a substantially transparent vessel enclosing a display volume defined by a fluorescent dye suspended in a substantially transparent liquid matrix that includes water, methanol, ethanol, and DMSO;

and an excitation source for generating first and second excitation beams that cause visible light to he generated wherever the first excitation beam intersects the second excitation beam within the display volume.

9. A three dimensional volumetric display comprising:

a substantially transparent vessel enclosing a display volume defined by a fluorescent dye suspended in a substantially transparent matrix that includes polymethyl methacrylate, plastic, porous glass, and epoxy;

and an excitation source for generating first and second excitation beams that cause visible light to be generated wherever the first excitation beam intersects the second excitation beam within the display volume.

10. A three dimensional volumetric display comprising:

a substantially transparent vessel enclosing a display volume defined by a fluorescent dye suspended in a substantially transparent gel matrix;

and an excitation source for generating first and second excitation beams that cause visible light to be generated wherever the first excitation beam intersects the second excitation beam within the display volume.

11. A three dimensional volumetric display comprising:

a substantially transparent vessel enclosing a display volume defined by an infrared-absorbing phosphor suspended in a substantially transparent matrix that fills the vessel;

and an optical excitation source for generating a first optical beam that causes visible light to be emitted at the intersection of the first optical beam within the display volume.

12. A three dimensional volumetric display comprising: a substantially transparent vessel enclosing a display volume defined by an infrared-absorbing phosphor suspended in a substantially transparent matrix that fills the vessel; and an optical excitation source for causing first and second optical beams to be generated that cause visible light be emitted at the intersection of the first and second optical beams within the display volume.

13. The three dimensional volumetric display of claim 12 wherein the first optical beam has a wavelength of 355 nm and the second optical beam has a wavelength of 1064 nm.

14. The three dimensional volumetric display of claim 11 wherein the excitation source comprises:

an Nd:YAG laser for generating an infrared laser beam;

a tripler coupled to the Nd:YAG laser for converting a portion of the infrared laser beam to an ultraviolet laser beam;

and a beamsplitter for separating the infrared laser beam from the ultraviolet laser beam.

15. A three dimensional volumetric display comprising:

a display volume filled with a substantially transparent fluorescent gas; and an excitation source for generating a beam of excitation energy and includes a mirror having a focal point in the display volume for concentrating the beam of excitation energy so that visible light is generated at the focal point.

16. A three dimensional volumetric display comprising:

a substantial transparent vessel enclosing a display volume defined by a fluorescent dye suspended in a substantially transparent matrix;

an excitation source for generating a beam of excitation energy; and a mirror having a focal point in the display volume for concentrating the beam of excitation so that visible light is generated at the focal point.

17. A three dimensional volumetric display comprising:

a substantially transparent vessel enclosing a display volume defined by an infrared-absorbing phosphor suspended in a substantially transparent matrix that fills the vessel;

an optical excitation source for generating an optical beam; and a mirror having a focal point in the display volume for concentrating the optical beam of excitation energy so that visible light is generated at the focal point.

* * * * *